Figure 1:
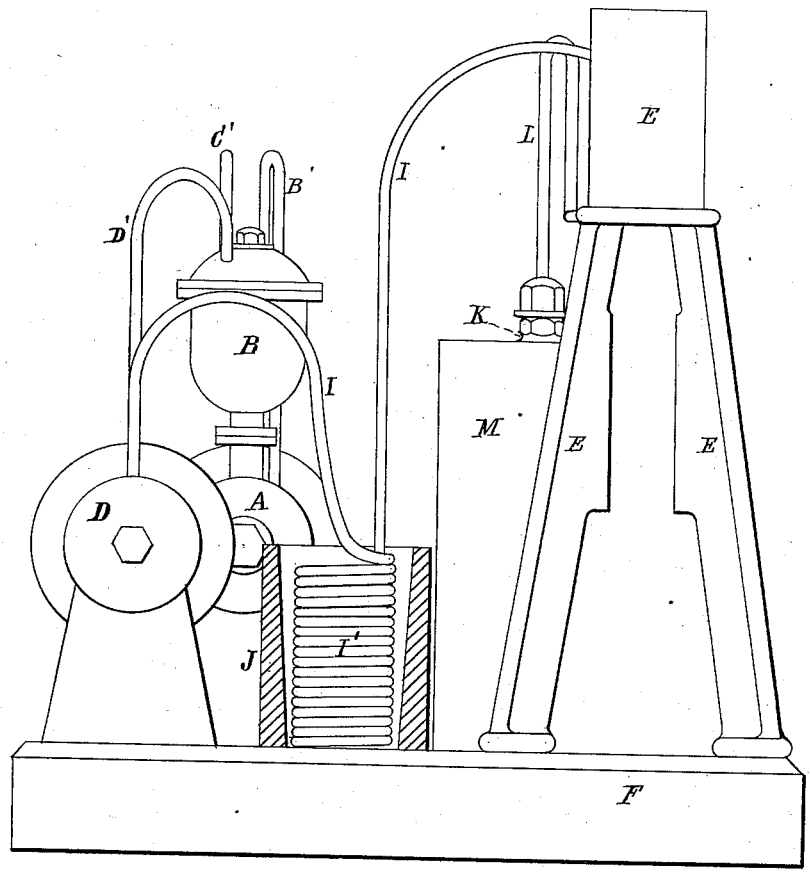

W. N. HILL.
Machine for Making Liquid Carbonic Acid.

No. 163,376.

3 Sheets--Sheet 1.

Patented May 18, 1875.

Witnesses,
James W. Potter
Wm. C. Hibbard

Inventor,
Walter N. Hill.

3 Sheets--Sheet 2.

W. N. HILL.
Machine for Making Liquid Carbonic Acid.

No. 163,376. Patented May 18, 1875.

Witnesses.
James W. Potter
Wm. C. Hibbard

Inventor.
Walter N. Hill.

THE GRAPHIC CO.PHOTO-LITH.39 & 41 PARK PLACE,N.Y.

W. N. HILL.
Machine for Making Liquid Carbonic Acid.

No. 163,376.  
Patented May 18, 1875.

Witnesses.  
James W. Potter  
Wm C. Hibbard

Inventor.  
Walter N. Hill.

UNITED STATES PATENT OFFICE.

WALTER N. HILL, OF NEWPORT, RHODE ISLAND.

IMPROVEMENT IN MACHINES FOR MAKING LIQUID CARBONIC ACID.

Specification forming part of Letters Patent No. 163,376, dated May 18, 1875; application filed December 7, 1874.

*To all whom it may concern:*

Be it known that I, WALTER N. HILL, now of Newport, in the county of Newport and State of Rhode Island, have invented certain Improvements in Machines for Making Liquid Carbonic Acid, of which the following is a specification:

The subject-matter of my invention consists of certain improvements in the apparatus for making liquid carbonic acid from the gaseous state in which it is generated, and liquefying other gaseous bodies, by which this can be accomplished practically in a much better manner than by the apparatus that has been heretofore employed for that purpose.

The making of liquid carbonic acid has been considered mainly as a curious chemical experiment, in which economical considerations have been practically disregarded; but in making the liquid acid in quantity, to be used, for instance, as a motive power, about which I am at present engaged, the economy of its production becomes very important.

The process of making the liquid acid consists, in a general way, in producing carbonic-acid gas from ground marble treated with sulphuric acid in a closed generator, as is usual in making mineral-water, collecting the gas so set free, and then, by the compression and refrigeration of the gas, it becomes liquid.

Previous to my invention liquid carbonic acid had been produced from the gaseous state by compressing it by means of a pump from about the atmospheric pressure till it became liquid; but in order to produce this result the amount of compression required was so enormous that any pump that could produce it must be so small as to be comparatively inefficient for any practical purpose of making the liquid acid in quantity. But the gas can be generated at a very high pressure, of, say, from five to ten atmospheres or more; and the purpose of the first part of my invention is to utilize this pressure to aid in the liquefication, and consists in the combination of the generator with the pump, so that this pressure may be used to aid the pump in further compressing the gas, and also, by the same means, to reduce the volume of the gas, and thereby very greatly increase the relative capacity of the pump, so that by means of pumps driven by power I have been able to produce liquid carbonic acid in this way in large quantities with comparative facility.

Figure 2:
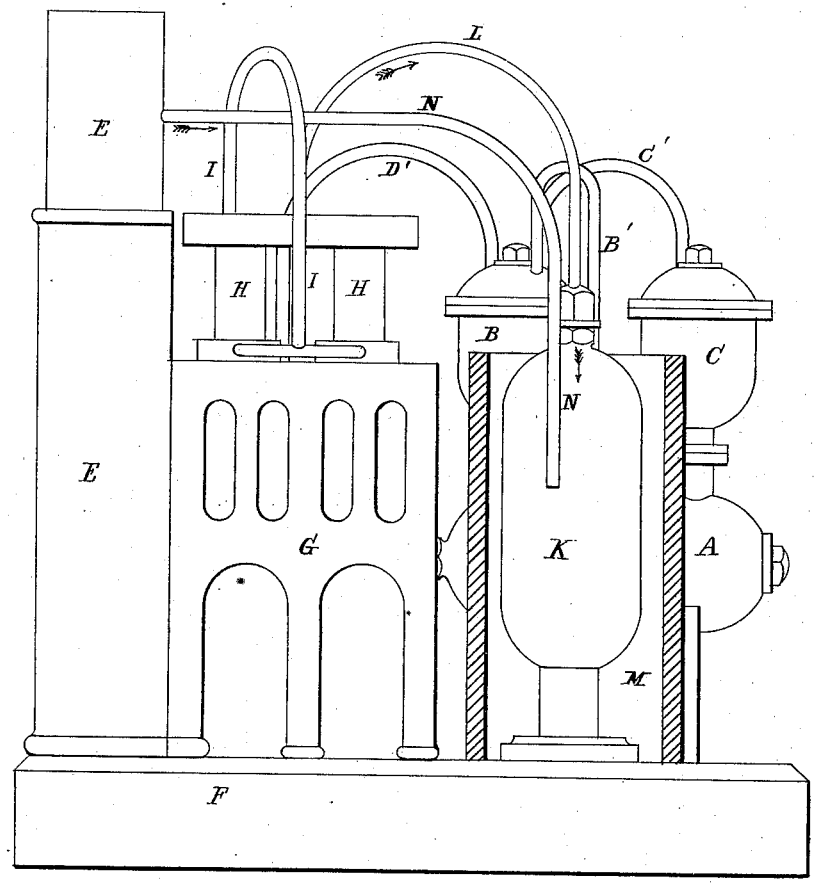
Figure 3:
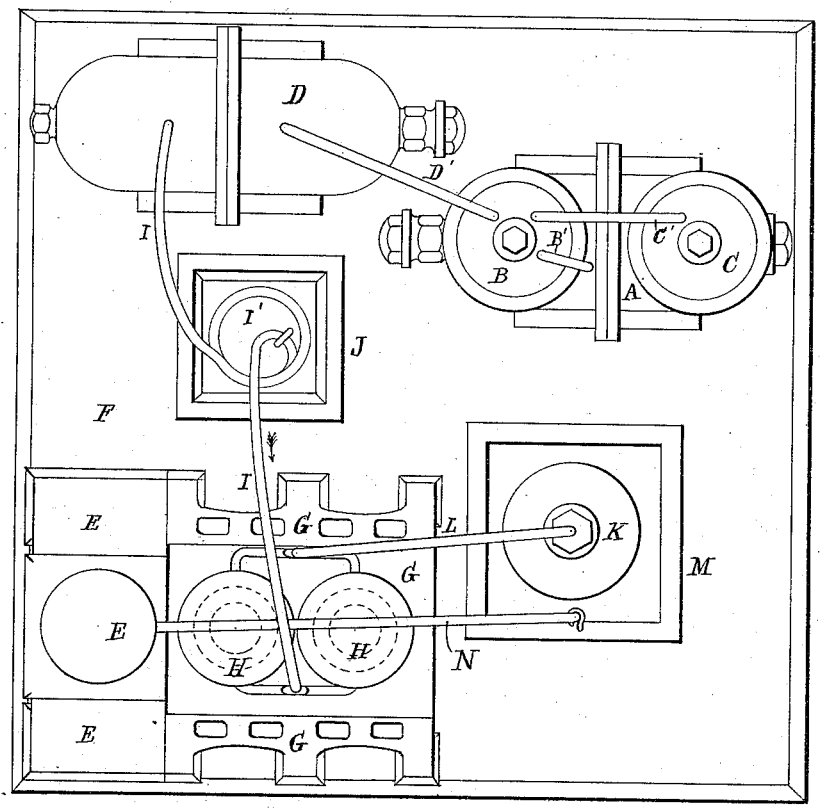

In the drawings, Figure 1 is an elevation of the improved apparatus. Fig. 2 is an elevation of the same at a right angle to the other, and Fig. 3 is a plan of the same.

A represents a strong cast-iron cylinder or chamber, in which the gas is generated in any usual way, but usually from fragments of marble treated with sulphuric acid. B is an overflow-chamber, to intercept the liquid contents of the generator which may rise in foam from the chemical action of the materials used and pass over with the gas. C is the vessel for containing the sulphuric acid. B' and C' are pipes for maintaining an equilibrium of pressure in the several pieces. D is a strong receptacle or reservoir for receiving the gas under high tension as it is made, and D' is the pipe for connecting the same with the generator, as shown. The general structure of these parts is well known, and forms no part of my present invention. E is an ordinary steam-engine, mounted upon the bed-plate F, as shown, which also carries the pump-frame G, which is provided with two compressing-pumps, H H, the plungers of which are driven from the crank-shaft, which is driven directly by the engine E. The construction of this part of the mechanism is also not of my invention. I is the induction-pipe, which leads from the reservoir D to the pumps. An intermediate portion of this pipe is made in the form of a coil, I', which is immersed in a cistern, J, filled with ice or refrigerating mixture, to cool the gas as it passes from the reservoir to the pumps, and take up the heat that is produced by the chemical action by which the gas is generated. By this means, together with the great pressure already produced upon the gas in generating it, the volume of the gas is greatly diminished, so that with pumps of a given cubical capacity the relative capacity of the same, or the amount of gas that can be compressed at each stroke, is greatly increased, and the tension of the influent gas exerted upon the pumps also aids them in producing the further compression of the gas necessary to liquefy it.

It has been proposed by me to operate the compressing-engine under certain circumstances by means of compressed air, and in such case I have devised a method of usefully employing the exhausted air from the engine to refrigerate either the gas or the liquid acid after it has been compressed.

In the drawings, K is a strong reservoir, which receives the acid from the pumps H H by means of the pipe L. This reservoir is immersed in the cistern M, which is filled with ice or some refrigerating mixture, (if the engine is driven by steam,) to further eliminate the heat produced by the compression of the gas; but if the engine is driven by compressed air the exhaust-pipe N of the engine is led into the cistern M toward the bottom, and by the expansion of the air an amount of refrigeration is produced sufficient to nearly or quite freeze the water surrounding the reservoir K; or, instead of this, the exhaust-pipe can be led into the cistern J, and produce its refrigerating effect in that cistern instead of the other one.

This improvement may also obviously be used to treat other gases in a similar manner.

What I claim is—

1. The combination of the generator for supplying the gas under pressure with the pump or pumps for further compressing the same, by which the pressure of the gas in the generator is made to aid the operation of the pumps, substantially as described.

2. The combination of the generator for supplying gas under pressure with the pump or pumps for further compressing the same, and the refrigerator interposed between the pumps and generator, by which the gas is cooled and reduced in volume while under pressure, substantially as described.

Executed December 1, 1874.

WALTER N. HILL.

Witnesses:
JAMES W. POTTER,
WM. C. HIBBARD.